(12) United States Patent
Bukovitz et al.

(10) Patent No.: US 9,701,009 B2
(45) Date of Patent: Jul. 11, 2017

(54) TOOL HOLDER

(71) Applicant: The Wooster Brush Company, Wooster, OH (US)

(72) Inventors: Richard K. Bukovitz, Orrville, OH (US); John L. Scott, Sr., Wooster, OH (US)

(73) Assignee: The Wooster Brush Company, Wooster, OH (US)

( * ) Notice: Subject to any disclaimer, the term of this patent is extended or adjusted under 35 U.S.C. 154(b) by 458 days.

(21) Appl. No.: 14/274,794

(22) Filed: May 12, 2014

(65) Prior Publication Data

US 2014/0369739 A1     Dec. 18, 2014

Related U.S. Application Data

(60) Provisional application No. 61/834,587, filed on Jun. 13, 2013.

(51) Int. Cl.
*B25G 1/06* (2006.01)
*B25G 3/20* (2006.01)
(Continued)

(52) U.S. Cl.
CPC ............. *B25G 3/20* (2013.01); *B25G 1/06* (2013.01); *B25G 3/24* (2013.01); *B25H 1/0035* (2013.01);
(Continued)

(58) Field of Classification Search
CPC ... B25G 1/04; B25G 1/06; B25G 3/04; B25G 3/06; B25G 3/12; B25G 3/20; B25G 3/22; B25G 3/24; B25G 3/26; B25H 1/0035; B25H 1/0057; F16B 2/06; F16B 2/065; F16B 2/12; F16B 2/18; F16B 2/185; F16C 11/04; F16C 11/10; F16C 11/103; F16M 11/04; F16M 11/06; F16M 11/08; F16M 11/10; Y10T 403/32106; Y10T 403/32114;
(Continued)

(56) References Cited

U.S. PATENT DOCUMENTS 566,521 A  *  8/1896  Leger ................ F16B 7/105
                                                                  403/105
936,150 A     10/1909  Nelson
(Continued)

FOREIGN PATENT DOCUMENTS

GB        395898 A  *  7/1933  ............ B25G 3/24
WO  WO 2008130908 A2 * 10/2008  ........... B05C 17/022

OTHER PUBLICATIONS

Wooster Brush and Tool Holder, 1 page (enclosed)—Admitted Prior Art.

*Primary Examiner* — Josh Skroupa
(74) *Attorney, Agent, or Firm* — Renner, Otto, Boisselle & Sklar, LLP

(57) ABSTRACT

A tool holder comprises a cage assembly having a pair of axially spaced hollow members with axially aligned through openings sized for axial extension of tool handles of different sizes and shapes through both of the aligned openings. A cradle member is transversely movable in opposite directions between the hollow members toward and away from respective inwardly facing wall surfaces of the hollow members for releasably clamping tool handles extending through both aligned openings against the inwardly facing wall surfaces.

17 Claims, 6 Drawing Sheets

(51) Int. Cl.
*B25G 3/24* (2006.01)
*F16B 2/06* (2006.01)
*F16B 2/12* (2006.01)
*F16C 11/10* (2006.01)
*F16M 11/06* (2006.01)
*B25H 1/00* (2006.01)

(52) U.S. Cl.
CPC ............... *F16B 2/065* (2013.01); *F16B 2/12* (2013.01); *F16C 11/103* (2013.01); *F16M 11/06* (2013.01); *Y10T 403/32114* (2015.01); *Y10T 403/32368* (2015.01); *Y10T 403/32532* (2015.01); *Y10T 403/4611* (2015.01); *Y10T 403/7062* (2015.01); *Y10T 403/7067* (2015.01)

(58) Field of Classification Search
CPC ..... Y10T 403/32172; Y10T 403/32181; Y10T 403/32262; Y10T 403/32286; Y10T 403/32319; Y10T 403/32327; Y10T 403/32368; Y10T 403/32418; Y10T 403/32426; Y10T 403/32532; Y10T 403/3961; Y10T 403/4611; Y10T 403/4688; Y10T 403/7041; Y10T 403/7062; Y10T 403/7067
USPC ........ 403/65, 66, 73, 74, 84, 87, 91, 92, 97, 403/103, 104, 110, 196, 234, 261, 362, 403/373, 374.3; 248/111, 113
See application file for complete search history.

(56) References Cited

U.S. PATENT DOCUMENTS

| | | | |
|---|---|---|---|
| 1,706,215 A * | 3/1929 | Davidson | E04G 7/16 403/385 |
| 2,510,198 A | 6/1950 | Tesmer | |
| 2,550,625 A * | 4/1951 | Vick | B63H 16/06 403/110 |
| 2,792,581 A * | 5/1957 | Woyton | A46B 17/02 15/144.1 |
| 2,794,265 A | 6/1957 | Kruger | |
| 2,817,548 A | 12/1957 | Uthemann | |
| 2,884,709 A | 5/1959 | Kruger | |
| 2,912,769 A | 11/1959 | Kruger | |
| 3,273,192 A | 9/1966 | Mazzella | |
| 3,357,035 A | 12/1967 | Ficke | |
| 3,583,734 A | 6/1971 | Magi | |
| 3,737,187 A | 6/1973 | Pryor | |
| 4,029,279 A | 6/1977 | Nakatani | |
| 4,174,900 A | 11/1979 | Ina | |
| 4,185,936 A | 1/1980 | Takahashi | |
| 4,528,714 A | 7/1985 | Beck | |
| 4,614,452 A * | 9/1986 | Wang | F16B 7/04 403/146 |
| 4,662,771 A | 5/1987 | Roe et al. | |
| 4,715,089 A | 12/1987 | Schema | |
| 4,741,222 A * | 5/1988 | Berndt | B60W 30/18 180/315 |
| 4,761,092 A | 8/1988 | Nakatani | |
| D299,693 S | 2/1989 | Wick | |
| 4,854,625 A | 8/1989 | Eubanks et al. | |
| 4,932,622 A | 6/1990 | Hayakawa | |
| D312,566 S | 12/1990 | Scherer | |
| 5,039,118 A * | 8/1991 | Huang | B62B 9/20 280/47.371 |
| 5,056,952 A | 10/1991 | Gringer | |
| 5,154,435 A * | 10/1992 | Chiu | B62B 1/045 280/47.315 |
| 5,154,449 A | 10/1992 | Suei-Long | |
| 5,427,465 A * | 6/1995 | Sato | E04G 7/16 403/385 |
| 5,564,852 A * | 10/1996 | Maxwell | F16C 11/10 403/171 |
| 5,584,210 A * | 12/1996 | Gelbein | B62K 23/06 403/110 |
| 5,626,320 A * | 5/1997 | Burrell | B64D 43/00 248/227.4 |
| D396,755 S | 8/1998 | Lennox | |
| 5,791,805 A | 8/1998 | Lynch et al. | |
| 5,903,952 A | 5/1999 | Camp, Jr. et al. | |
| 6,189,420 B1 | 2/2001 | Shiao | |
| D446,022 S | 8/2001 | Vonarburg et al. | |
| 6,286,968 B1 * | 9/2001 | Sailer | B60R 1/0617 248/478 |
| D454,479 S | 3/2002 | Kolpin | |
| D456,147 S | 4/2002 | Anderson | |
| D484,399 S | 12/2003 | Arthur | |
| D499,954 S | 12/2004 | Brushaber | |
| 7,093,313 B2 * | 8/2006 | DeBraal | A61G 13/121 248/292.12 |
| 7,100,238 B2 | 9/2006 | McCauley | |
| D554,975 S | 11/2007 | Kimura | |
| D556,458 S | 12/2007 | Lanz | |
| D558,027 S | 12/2007 | Lanz | |
| D586,060 S | 2/2009 | Kahn | |
| D604,345 S | 11/2009 | Camp et al. | |
| 7,896,569 B2 * | 3/2011 | Katzenstein | A61G 13/12 403/101 |
| D636,658 S | 4/2011 | McGrath | |
| 8,162,557 B2 * | 4/2012 | Van Zile, III | B25J 15/0052 403/385 |
| D662,398 S | 6/2012 | Jahnke et al. | |
| D667,290 S | 9/2012 | Chelton | |
| 8,562,238 B2 * | 10/2013 | Hasei | A01D 34/90 403/234 |
| 9,206,943 B2 * | 12/2015 | Chang | A45B 3/00 |
| 2006/0285915 A1 * | 12/2006 | Dellach | F16C 11/10 403/92 |
| 2014/0112702 A1 * | 4/2014 | Mighells | F16C 11/10 403/92 |

* cited by examiner

TOOL HOLDER

CROSS-REFERENCE TO RELATED APPLICATION

This application claims the benefit of U.S. Provisional Application Ser. No. 61/834,587, filed Jun. 13, 2013, the entire disclosure of which is incorporated herein by reference.

FIELD OF THE INVENTION

This invention relates generally to a tool holder for extension pole use that is capable of firmly holding different tools having a wide range of tool handle sizes and shapes, and that is indexable to a wide range of angles to permit the tools to reach odd angles at various heights.

BACKGROUND

It is generally known to provide tool holders designed to mount a tool on extension poles. Also it is generally known to provide tool holders capable of retaining tools at different angles.

However, there is an ongoing need for a tool holder that is capable of more firmly holding various tools having a wide range of tool handle sizes and shapes. Also there is an ongoing need to be able to index the tool holder to a wide range of angles to permit the tools to reach odd angles at various heights.

SUMMARY OF THE INVENTION

In accordance with one aspect of the present invention, the tool holder comprises a cage assembly having a pair of axially spaced hollow members having axially aligned through openings sized for axial extension of tool handles of different sizes and shapes through both aligned openings, and a cradle member transversely movable in opposite directions between the hollow members for firmly clamping the tool handles extending through both aligned openings against inwardly facing wall surfaces of the hollow members.

In accordance with another aspect of the invention, the tool holder includes a holder handle for attachment of the tool holder to extension poles of various types, and the cage assembly is indexably connected to the holder handle to allow for adjustment of the angular orientation of the cage assembly relative to the holder handle to a wide range of angles to permit tools firmly held thereby to reach odd angles at various heights.

These and other objects, advantages, features and aspects of the present invention will become apparent as the following description proceeds.

DETAILED DESCRIPTION

Figure 1:
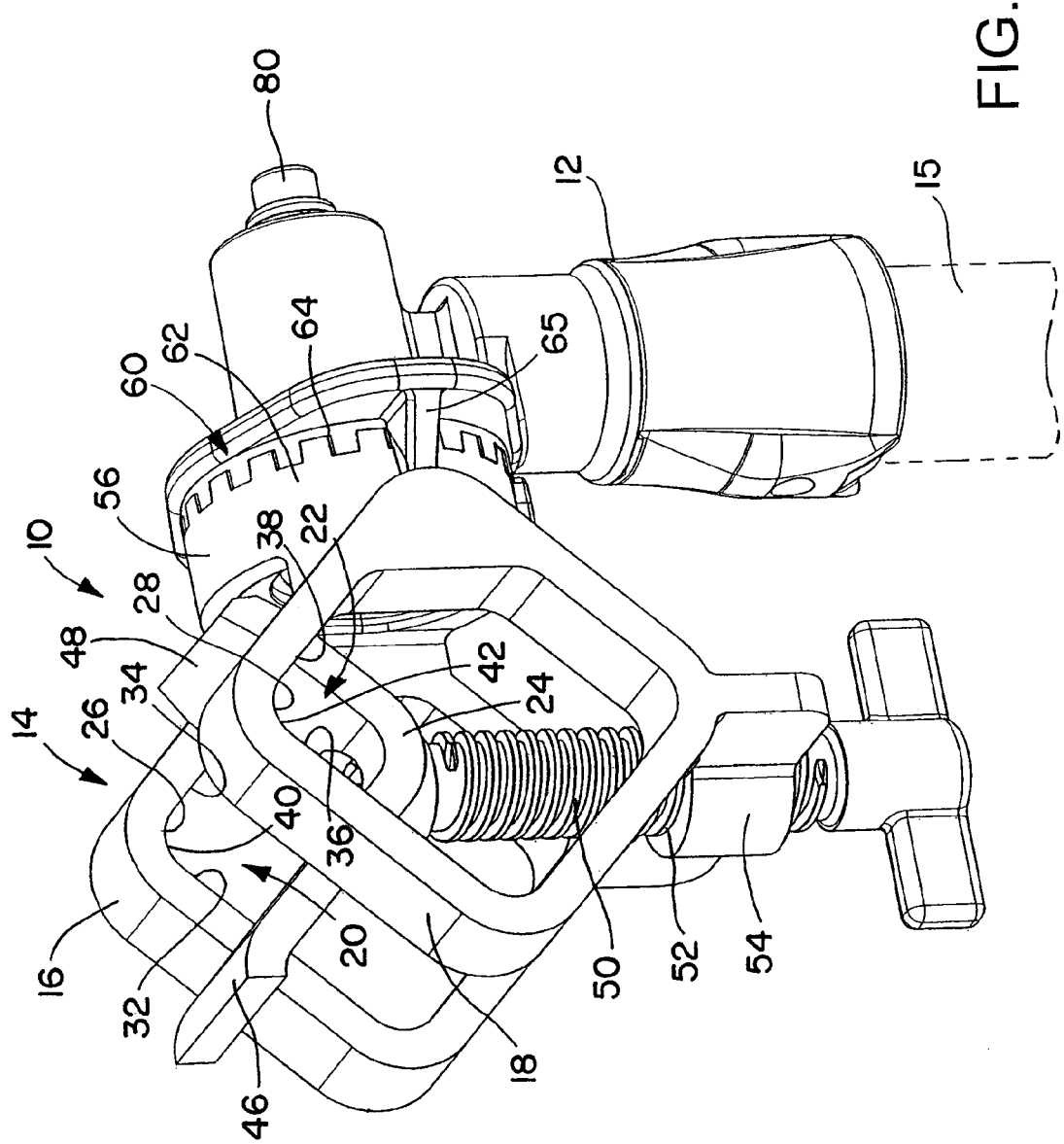
FIG. 1 is a perspective view of an exemplary tool holder of the present invention.
Figure 2:
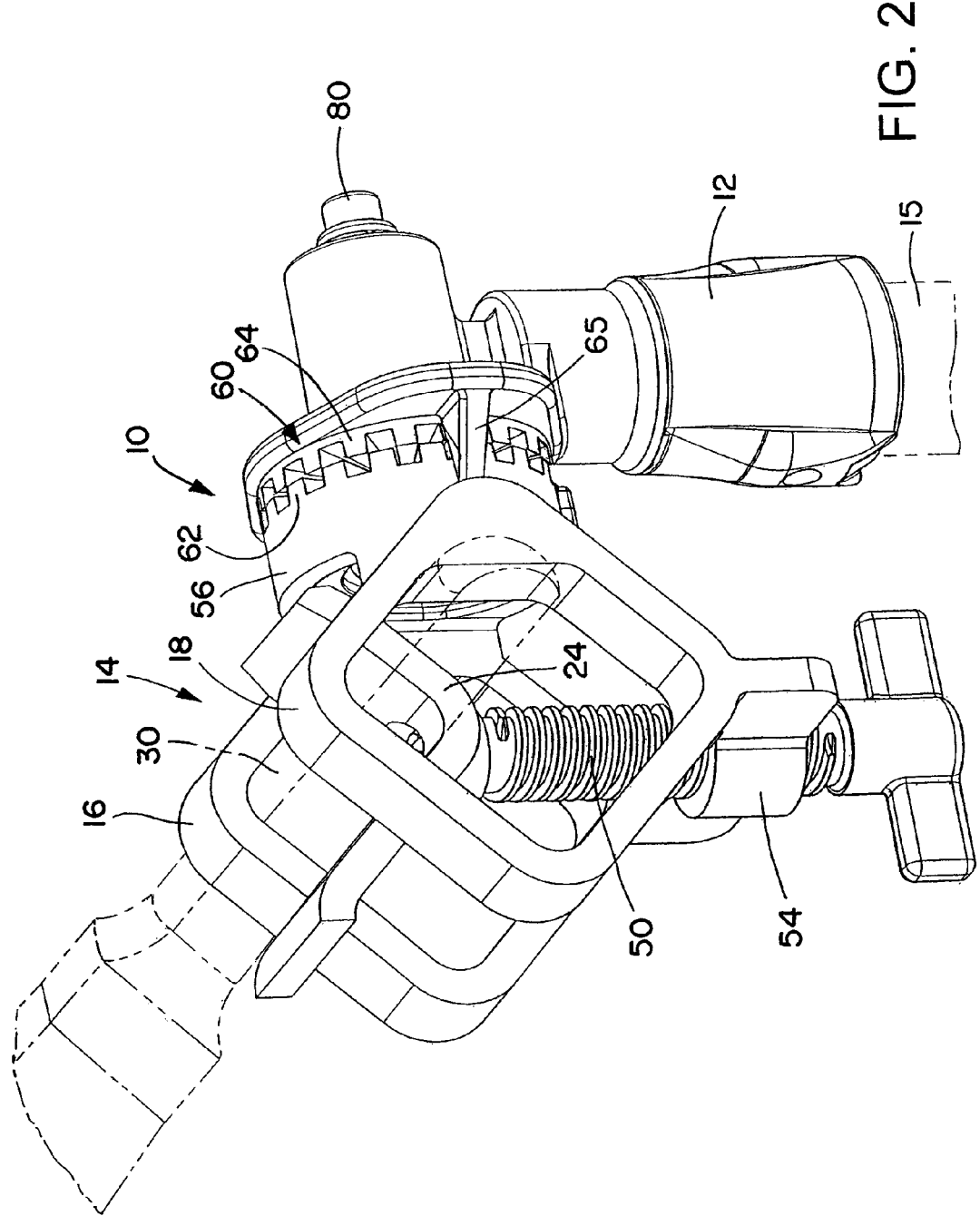
FIG. 2 is a perspective view of the tool holder similar to FIG. 1 but showing the teeth of self-locking face gears on the holder handle and cage assembly separated to allow for indexing movement of the cage assembly to a desired angle relative to the holder handle.
Figure 3:
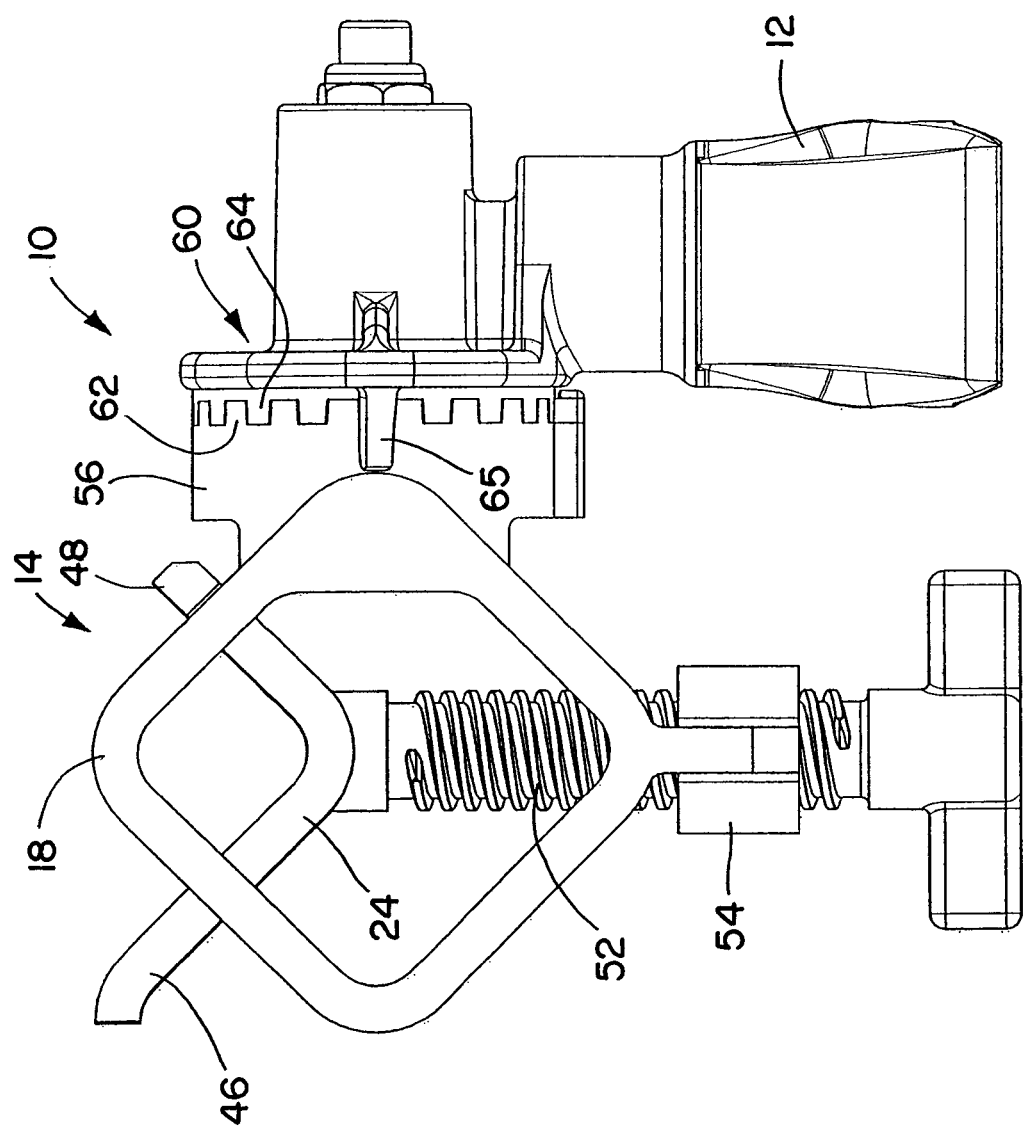
FIG. 3 is a front side elevation view of the tool holder of FIG. 1.
Figure 4:
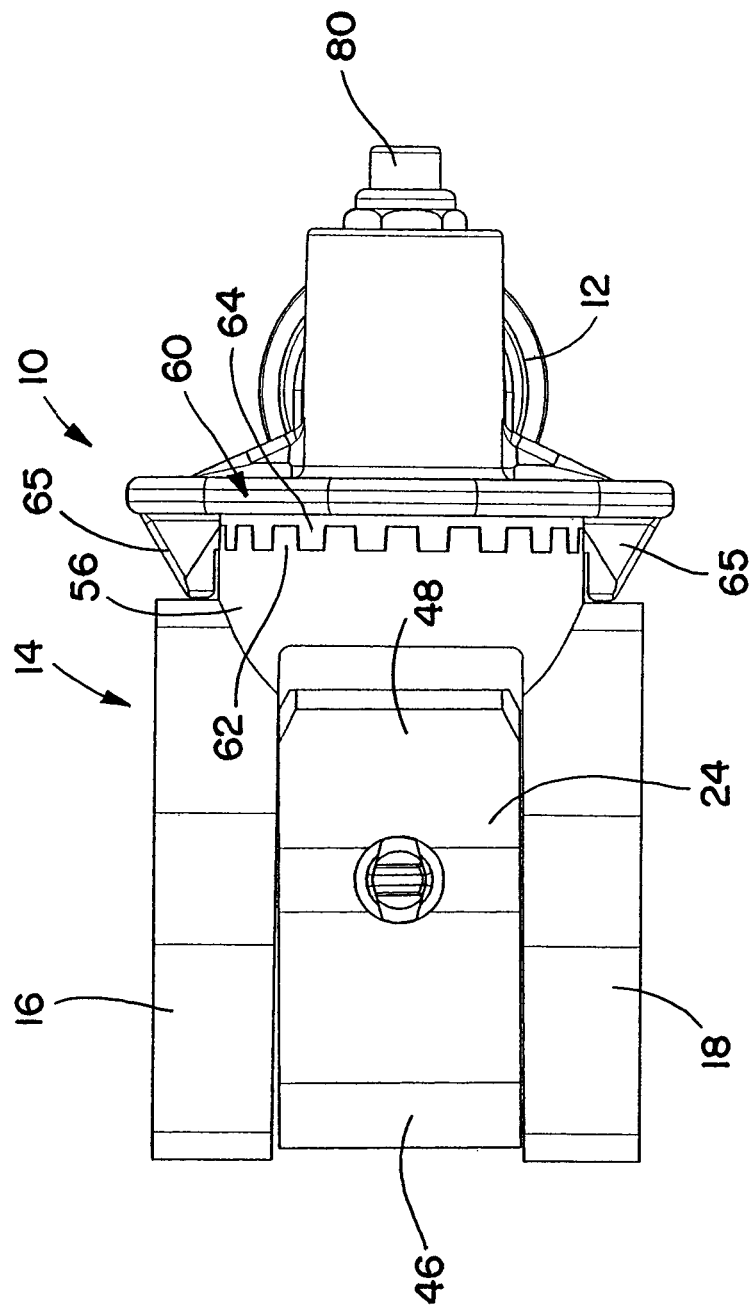
FIG. 4 is a top plan view of the tool holder of FIG. 3.
Figure 6:
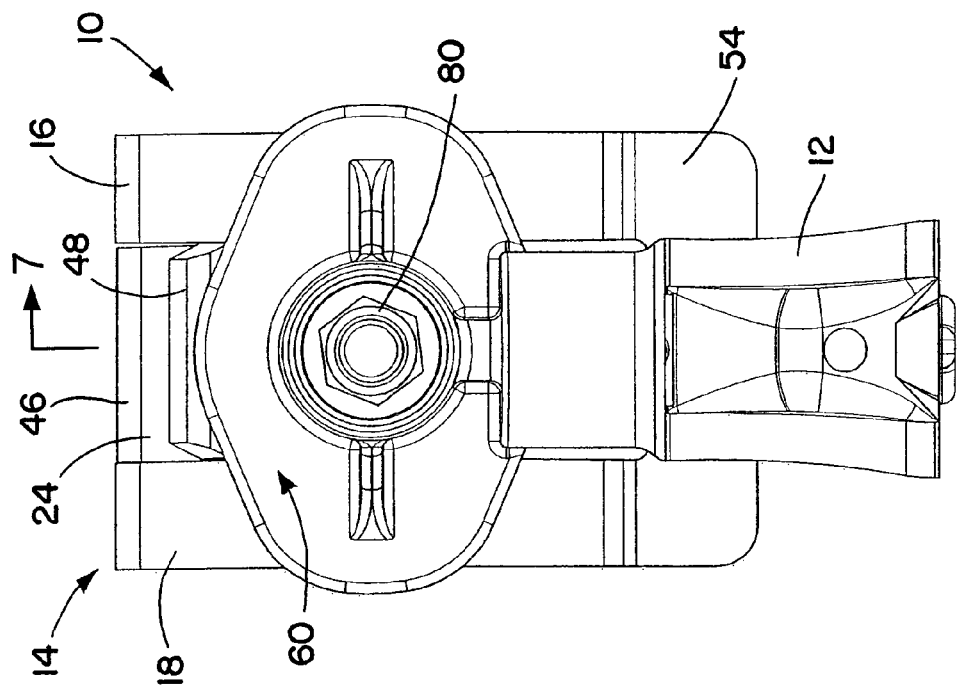
FIG. 6 is a right end elevation view of the tool holder of FIG. 3.
Figure 5:
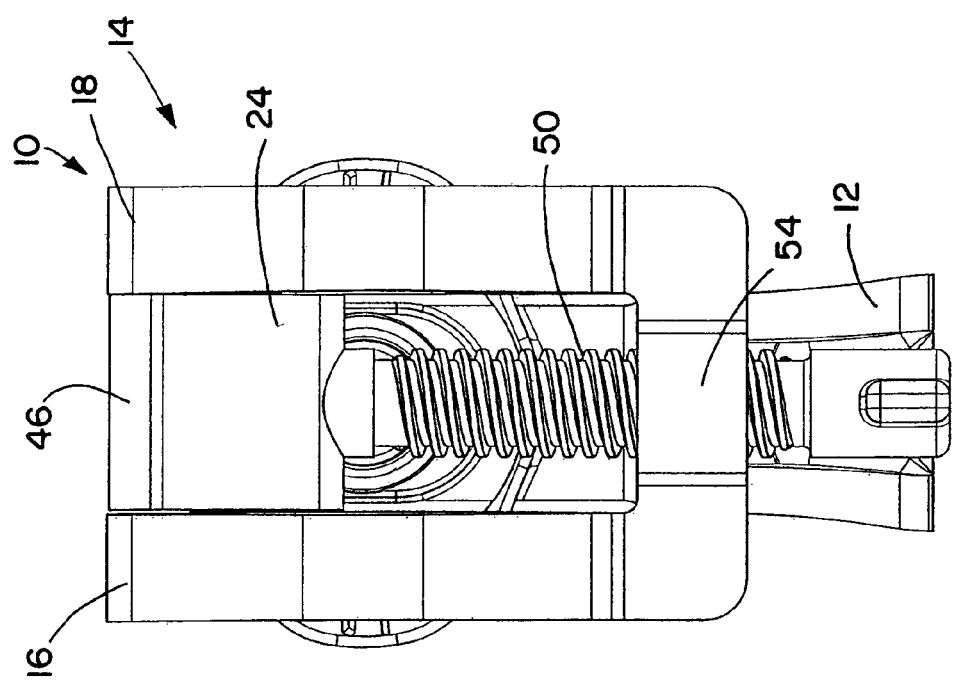
FIG. 5 is a left end elevation view of the tool holder of FIG. 3.

Referring now in detail to the drawings, and initially to FIGS. 1-3, there is shown an exemplary embodiment of a tool holder 10 in accordance with this invention including a holder handle 12 for extension pole use and a cage assembly 14 capable of firmly holding different tools having a wide range of tool handle sizes and shapes. The cage assembly 14 is indexable relative to the holder handle 12 to a wide range of angles to permit tools firmly held thereby to reach different angles at various heights as described in greater detail hereafter. FIGS. 1 and 2 show an extension pole 15 in phantom lines extending from the holder handle 12.

The cage assembly 14 comprises a pair of axially spaced hollow members 16, 18 having respective axially aligned through openings 20, 22 sized for axial extension of tool handles of different sizes and shapes through both aligned openings. A cradle member 24 is transversely movable in opposite directions between the hollow members 16, 18 toward and away from inwardly facing wall surfaces 26, 28 of the respective hollow members for releasably clamping tool handles 30 extending through the aligned openings against the inwardly facing wall surfaces as schematically shown in phantom lines in FIG. 2.

In the example shown in the drawings, the inwardly facing wall surfaces 26, 28 of each of the hollow members 16, 18 comprise two angled sides 32, 34 and 36, 38 that intersect each other at an included angle of approximately 90°, with a rounded inwardly facing corner 40, 42 therebetween. The cradle member 24 has a generally inverse shape substantially corresponding to the shape of the inwardly facing wall surfaces of the hollow members for firmly holding tool handles of different sizes and shapes therebetween when a clamping force is applied to the cradle member urging the cradle member toward the inwardly facing wall surfaces after the cradle member has been moved sufficiently far away from the inwardly facing wall surfaces to allow for insertion of the tool handles within the space therebetween. As evident from FIGS. 1-3, the farther the cradle member 24 is moved away from the inwardly facing wall surfaces 26, 28 of the hollow members 16, 18, the larger the open space therebetween for receipt of larger/different handle shapes.

The tool holder 1 may be used, for example, to firmly hold virtually any tool, including a paint brush, roller frame, trim roller, scraper, sander, duster, and/or flashlight, as long as the diameter of the tool handle does not exceed a maximum size, for example, 1¾ inches. However, it should be readily apparent that the size of the hollow members 16, 18 and associated cradle member 24 and angular orientation of the angled sides 32, 34 and 36, 38 of the inwardly facing wall surfaces 26, 28 of the hollow members and inverse shape of the cradle member may be increased or decreased for accommodating larger or smaller size tool handles as desired.

As can be seen throughout the drawings, the width of the cradle member 24 is slightly less than the lateral spacing between the two hollow members 16, 18, and the opposite ends 46, 48 of the cradle member extend laterally outwardly beyond the angled sides 32, 34 and 36, 38 of the inwardly facing wall surfaces of the hollow members for guiding of the cradle member during transverse movement between the hollow members.

In this example, transverse movement of the cradle member 24 between the hollow members 16, 18 is accomplished by supporting the cradle member on the axial outer end of a screw member 50 threadedly received in a threaded bore 52 in a cross member 54 between the ends of the hollow members opposite the inwardly facing wall surfaces 26, 28. As can be seen throughout the drawings, the threaded bore 52 is substantially in line with the approximate center of the axial space between the hollow members 16, 18.

The hollow members 16, 18 are supported at one side by a body member 56 that is indexably connected to the holder handle 12 to allow for adjustment of the angular orientation of the cage assembly 14 relative to the holder handle to a wide range of angles to permit the tools firmly held thereby to reach different angles at various heights. In the example disclosed herein, the indexable connection 60 comprises a pair of self-locking face gears 62, 64 on opposed surfaces of the holder handle 12 and body member 52 that are movable into and out of engagement with one another as shown for example in FIGS. 1 and 2 and indexable relative to one another when disengaged for adjusting the angular orientation of the body member and associated cage assembly relative to the holder handle. Circumferentially spaced flanges 65 on the holder handle 12 closely overlie the outer diameter of the self-locking face gears 62 on the body member 56 to help guide axial and indexing movement of the self-locking face gears 62 relative to the self-locking face gears 64 on the holder handle 12.

Figure 7:
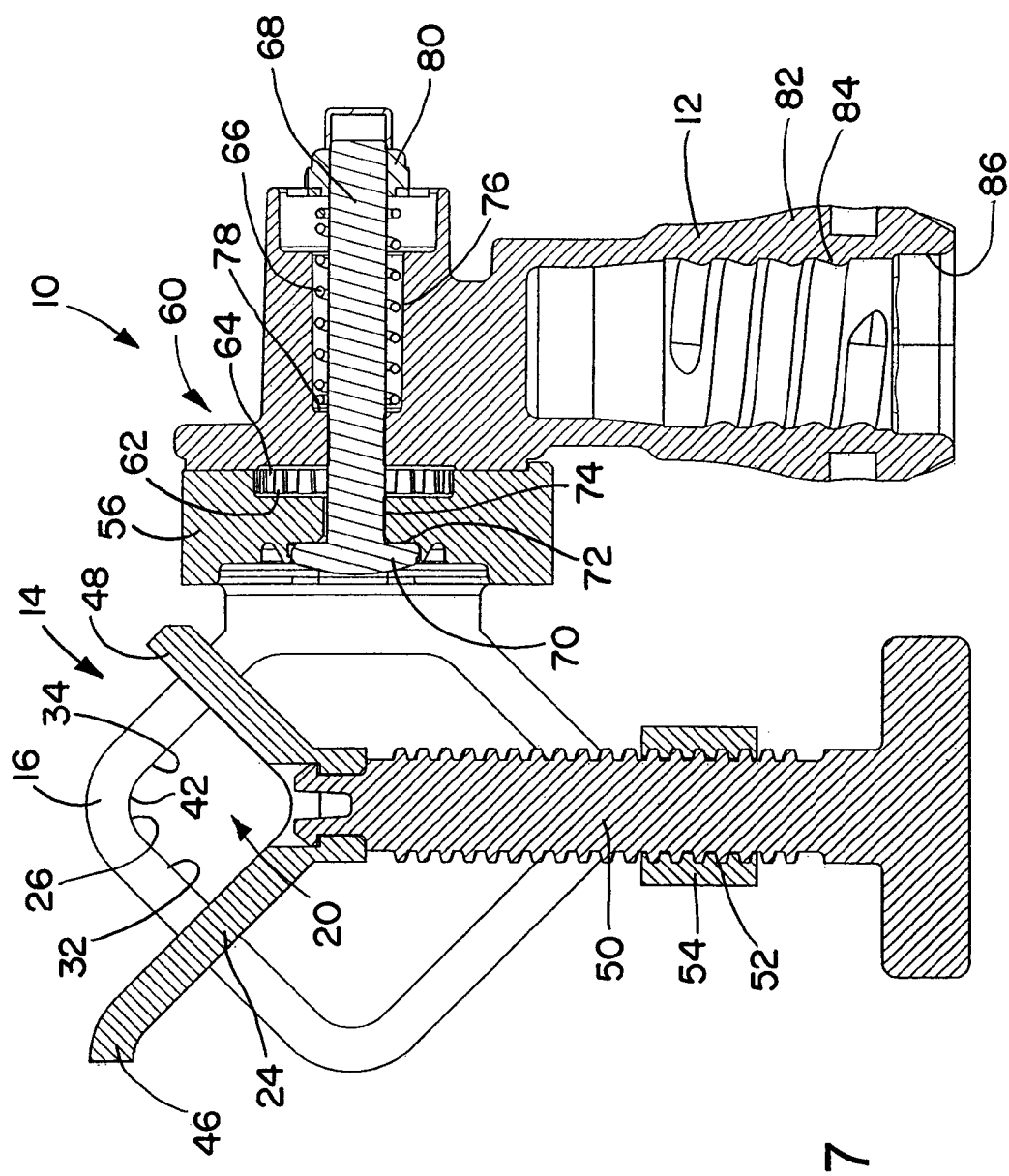
FIG. 7 is a longitudinal section through the tool holder of FIG. 6 taken on the plane of the line 7-7 thereof.

As best seen in FIG. 7, in this example, the body member 56 axis is substantially orthogonal to the screw member 50 axis, whereas the holder handle 12 axis is substantially orthogonal to the body member axis. Also the face gear surface 64 on the holder handle 12 is in a plane substantially parallel to the holder handle 12 axis, whereas the face gear surface 62 on the body member 56 is in a plane substantially orthogonal to the body member 56 axis.

The self-locking face gears 62, 64 are spring loaded toward one another by a compression spring 66 surrounding a rod 68 extending through aligned openings in the body member, face gears, and holder handle. The outer end of the rod 68 has a flange 70 that is received in a counterbore 72 at the outer end of the opening 74 in the body member 56 for limiting inward movement of the rod within the opening. Within the holder handle 12 is a counterbore 76 containing the compression spring 66 through which the rod 68 extends. The spring 66 is captivated between a shoulder 78 at the inner end of the counterbore 76 and a button/washer combination 80 secured to the innermost end of the rod. This allows for manual pulling of the face gears 62, 64 apart and indexing/turning the body member 56 and associated cage assembly relative to the holder handle 12 to a desired angle and releasing the pulling force to reengage the face gears to hold the cage assembly in the desired adjusted position. Although the increments of the spring loaded angle adjustments of the body member and associated cage assembly relative to the handle member may be varied as desired, in this example the spring loaded angle adjustments are preferably in about 10° to about 35° increments and more preferably about 15° increments to cover substantially all planes of the surface.

The holder handle 12 includes a hand grip 82 extending substantially orthogonal to the body member 56 axis containing a threaded socket 84 to permit the holder handle to be threadedly attached to virtually all standard threaded extension pole tips. Also the threaded socket 84 may be provided with a larger diameter non-circular recess 86 adjacent its outer end for establishing an anti-rotation connection with a quick release lock mechanism for extension pole tips of the type disclosed, for example, in U.S. Pat. No. 5,288,161 assigned to the same assignee as the present invention, the entire disclosure of which is incorporated herein by reference.

Although the invention has been shown and described with respect to a certain embodiment, equivalent alterations and modifications will become apparent upon the reading and understanding of the specification. In particular, with regard to the various functions performed by the above-described components, the terms used to describe such components are intended to correspond, unless otherwise indicated, to any component which performs the specified function of the described component (e.g., that is functionally equivalent), even though not structurally equivalent to the exemplary embodiment. In addition, while a particular feature may have been disclosed with respect to only one embodiment, such feature may be combined with one or more other features as may be desired or advantageous for any given or particular application.

What is claimed is:

1. A tool holder for firmly holding a wide range of sizes and shapes of tool handles, the tool holder comprising:
   a cage assembly, the cage assembly comprising a pair of axially spaced hollow members having axially aligned through openings sized for axial extension of tool handles of different sizes and shapes through both of the aligned openings, and
   a cradle member transversely movable in opposite directions between the hollow members toward and away from respective inwardly facing wall surfaces of the hollow members for releasably clamping the tool handles extending through both aligned openings against the inwardly facing wall surfaces, and
   wherein the cradle member has opposite ends extending laterally outwardly beyond opposite sides of the axially spaced hollow members for guiding the cradle member during transverse movement between the hollow members toward and away from the inwardly facing wall surfaces of the hollow members.

2. The tool holder of claim 1 further comprising a screw member for supporting the cradle member for transverse movement in opposite directions between the hollow members.

3. The tool holder of claim 1 wherein the inwardly facing wall surfaces of the hollow members against which the tool handles can be firmly clamped intersect each other at an angle of at least 90°.

4. The tool holder of claim 3 wherein the cradle member has a generally inverse shape substantially corresponding to the shape of the inwardly facing wall surfaces.

5. The tool holder of claim 1 wherein the cage assembly is connected to a holder handle.

6. The tool holder of claim 5 wherein the cage assembly is angularly adjustable for adjusting the angular orientation of the cage assembly and thus the tool handles when firmly held within the cage assembly relative to the holder handle.

7. The tool holder of claim 6 wherein one side of the cage assembly is connected to a body member, and the body member has an axis substantially orthogonal to an axis of the cradle member.

8. The tool holder of claim 7 wherein the holder handle has an axis substantially orthogonal to the body member axis.

9. The tool holder of claim 8 wherein the holder handle and the body member have self-locking face gears on opposed surfaces of the holder handle and the body member that are movable into and out of engagement with one another and indexable relative to one another when disengaged for adjusting the angular orientation of the cage assembly relative to the holder handle.

10. The tool holder of claim 9 wherein the face gear surface on the holder handle is in a plane substantially parallel to the holder handle axis, and the face gear surface on the body member is in a plane substantially orthogonal to the body member axis.

11. The tool holder of claim 10 wherein the self-locking face gears are spring loaded toward one another to allow for hand pulling of the face gears apart and indexing of the cage assembly relative to the holder handle to a desired angle prior to releasing the pulling force to reengage the face gears.

12. The tool holder of claim 11 wherein the spring loaded angle adjustments of the body member relative to the holder handle are in about 10° to about 35° increments.

13. The tool holder of claim 12 wherein the spring loaded angle adjustments are in about 15° increments.

14. A tool holder for firmly holding a wide range of sizes and shapes of tool handles, the tool holder comprising:
a cage assembly, the cage assembly comprising a pair of axially spaced hollow members having axially aligned through openings sized for axial extension of tool handles of different sizes and shapes through both of the aligned openings,
a cradle member transversely movable in opposite directions between the hollow members toward and away from respective inwardly facing wall surfaces of the hollow members for releasably clamping the tool handles extending through both aligned openings against the inwardly facing wall surfaces, and
a screw member for supporting the cradle member for transverse movement in opposite directions between the hollow members, and
wherein the hollow members are joined together at ends opposite the inwardly facing wall surfaces by a cross member, and the screw member is threadedly received in a threaded bore in the cross member substantially in line with an approximate center of an axial space between the hollow members.

15. A tool holder comprising:
a cage assembly, the cage assembly comprising a pair of axially spaced hollow members having axially aligned through openings sized for axial extension of tool handles of different sizes and shapes through both of the aligned openings,
a screw member transversely movable in opposite directions between the hollow members for releasably clamping the tool handles extending through the aligned openings against inwardly facing wall surfaces of the hollow members, and
a cradle member mounted on an axial outer end of the screw member for transverse movement in opposite directions between the hollow members for releasably clamping the tool handles against the inwardly facing wall surfaces of the hollow members, and
wherein the cradle member has opposite ends extending laterally outwardly beyond opposite sides of the axially spaced hollow members for guiding the cradle member during transverse movement between the hollow members toward and away from the inwardly facing wall surfaces of the hollow members.

16. The tool holder of claim 15 wherein one side of the cage assembly is connected to a body member, and the body member is indexably connected to a holder handle to allow for adjustment of the angular orientation of the body member and thus the tool handles when releasably clamped within the cage assembly relative to the holder handle.

17. The tool holder of claim 16 wherein the indexable connection between the body member and the holder handle comprises spring loaded self-locking face gears on opposed surfaces of the body member and the holder handle that allow for work angle adjustment of the body member relative to the holder handle.

* * * * *